(12) United States Patent
Bouchet et al.

(10) Patent No.: US 7,962,254 B2
(45) Date of Patent: Jun. 14, 2011

(54) METHOD AND SYSTEM FOR ASSISTING FLIGHT CONTROL OF A LOW-FLYING AIRCRAFT

(75) Inventors: Christophe Bouchet, Toulouse (FR);
Jean-Pierre Demortier, Maurens (FR);
Franck Artini, Toulouse (FR)

(73) Assignee: Airbus France, Toulouse (FR)

( * ) Notice: Subject to any disclaimer, the term of this patent is extended or adjusted under 35 U.S.C. 154(b) by 748 days.

(21) Appl. No.: 11/917,310

(22) PCT Filed: Jun. 12, 2006

(86) PCT No.: PCT/FR2006/001319
§ 371 (c)(1),
(2), (4) Date: Dec. 12, 2007

(87) PCT Pub. No.: WO2006/134256
PCT Pub. Date: Dec. 21, 2006

(65) Prior Publication Data
US 2008/0208400 A1 Aug. 28, 2008

(30) Foreign Application Priority Data
Jun. 14, 2005 (FR) ..................................... 05 05983

(51) Int. Cl.
*G05D 1/08* (2006.01)
(52) U.S. Cl. .................. 701/4; 701/3; 701/11; 701/301; 340/977
(58) Field of Classification Search ................ 701/4, 11, 701/14, 23; 340/967, 977, 980
See application file for complete search history.

(56) References Cited

U.S. PATENT DOCUMENTS

| | | | | |
|---|---|---|---|---|
| 5,442,556 A * | 8/1995 | Boyes et al. | ...................... | 701/9 |
| 5,555,175 A | 9/1996 | D'Orso | | |
| 6,088,654 A * | 7/2000 | Lepere et al. | .................. | 701/301 |
| 6,161,063 A * | 12/2000 | Deker | ........................ | 701/4 |
| 6,480,120 B1 * | 11/2002 | Meunier | ....................... | 340/970 |
| 7,089,090 B2 * | 8/2006 | Artini et al. | ....................... | 701/3 |
| 7,120,540 B2 * | 10/2006 | Meunier | ....................... | 701/301 |
| 7,321,813 B2 * | 1/2008 | Meunier | ........................ | 701/10 |
| 7,493,197 B2 * | 2/2009 | Bitar et al. | ....................... | 701/14 |
| 7,696,904 B2 * | 4/2010 | Horvath et al. | .............. | 340/961 |
| 7,714,744 B1 * | 5/2010 | Wichgers | ...................... | 340/965 |
| 2004/0078122 A1 * | 4/2004 | Pippenger | ......................... | 701/3 |
| 2004/0215372 A1 * | 10/2004 | Bateman et al. | .................. | 701/1 |
| 2005/0004723 A1 * | 1/2005 | Duggan et al. | .................. | 701/24 |
| 2005/0165516 A1 * | 7/2005 | Haissig et al. | .................... | 701/4 |
| 2005/0237226 A1 * | 10/2005 | Judge et al. | .................... | 340/946 |
| 2005/0261808 A1 * | 11/2005 | Artini et al. | ......................... | 701/3 |
| 2005/0261811 A1 * | 11/2005 | Artini et al. | ......................... | 701/3 |
| 2005/0273221 A1 * | 12/2005 | Artini et al. | ......................... | 701/3 |
| 2006/0052912 A1 * | 3/2006 | Meunier | ......................... | 701/10 |
| 2006/0074559 A1 * | 4/2006 | Meunier | ....................... | 701/301 |
| 2006/0290531 A1 * | 12/2006 | Reynolds et al. | ............. | 340/961 |
| 2009/0069959 A1 * | 3/2009 | Horvath et al. | ................... | 701/8 |

FOREIGN PATENT DOCUMENTS

| FR | 2607948 | 6/1988 |
|---|---|---|
| FR | 2658636 | 8/1991 |

\* cited by examiner

*Primary Examiner* — Mark Hellner
*Assistant Examiner* — Helal A Algahaim
(74) *Attorney, Agent, or Firm* — Dickinson Wright PLLC

(57) ABSTRACT

A system determines a limit angle of climb corresponding to a climb angle of an aircraft for flying over the ground along an avoidance path and displays a characteristic sign representing the limit angle of climb on a display screen.

31 Claims, 7 Drawing Sheets

METHOD AND SYSTEM FOR ASSISTING FLIGHT CONTROL OF A LOW-FLYING AIRCRAFT

FIELD OF THE INVENTION

The present invention relates to a method and a system for aiding the piloting of an aircraft flying at low altitude.

BACKGROUND OF THE RELATED ART

Within the framework of the present invention, low-altitude flight is understood to mean flight along a flight trajectory (at low altitude) allowing an aircraft to follow as closely as possible the terrain overflown, especially so as to avoid being pinpointed. Such a flight trajectory at low altitude is therefore situated at a predetermined terrain height, for example 500 feet (about 150 meters).

Although not exclusively, the present invention applies more particularly to a military transport plane which exhibits a low thrust/weight ratio and a high inertia, and whose maneuvering times are in general relatively slow. In the event of detection of a ground-air threat (visually or else by an onboard electronic counter-measures system), such a military transport plane must be capable, for obvious safety reasons, of rapidly performing a course modification, which modification was not programmed at the outset.

However, the determination of a low-altitude flight trajectory requires a very high calculational power on the part of the aircraft's onboard systems. As a course modification that makes it possible to exit a hostile zone as soon as possible must be able to be performed at almost no notice, the pilot cannot manually reschedule a new course. Specifically, firstly, such a manipulation requires time (point by point rescheduling), and secondly the calculation of the low-altitude trajectory over a new lateral course also requires a certain delay. These various times are of the order of several seconds, and this may be much too long in certain situations to enable the aircraft to distance itself from a hostile zone, in particular during an aforesaid threat of ground-air type.

SUMMARY OF THE INVENTION

The present invention is aimed at remedying these drawbacks. It relates to a method of aiding the piloting of an aircraft flying at low altitude.

For this purpose, according to the invention, said method is noteworthy in that the following operations are carried out in an automatic and repetitive manner:
a) at least one avoidance trajectory is determined, at least over a predetermined distance ahead of the aircraft, said avoidance trajectory corresponding to a low-altitude lateral trajectory and exhibiting at least one lateral turn;
b) the profile of the terrain situated under this avoidance trajectory is determined;
c) at least one first limit slope corresponding to a slope that the aircraft must fly so as to be able to overfly said terrain over the whole of said predetermined distance along said avoidance trajectory is determined depending on said profile of the terrain; and
d) the pilot is presented, on a viewing screen, with at least one first characteristic sign which represents said first limit slope and which is associated with a slope scale, with which is also associated a symbol illustrating the ground speed vector of the aircraft.

Thus, by virtue of the invention, the pilot has available, at any time and with no action on his part, at least one avoidance trajectory making it possible to carry out an avoidance flight maneuver, in particular in the event of a sudden threat, especially a ground-air threat. Such an avoidance trajectory then enables the pilot to distance himself from the threat, while continuing to fly at low altitude (according to said avoidance trajectory), doing so in complete safety since the pilot also knows the limit slope at which he must fly the aircraft in order to overfly the terrain along said avoidance trajectory. It will be noted, moreover, that said symbol illustrating the ground speed vector provides the pilot with an indication as to the instantaneous ground slope of the aircraft.

Thus, by virtue of the invention, during an avoidance maneuver, the aircraft can continue to fly at low altitude with the same integrity as when flying along the initial low-altitude trajectory (calculated along the initial flight plan).

In a first embodiment, said first limit slope corresponds to a minimum slope that the aircraft must fly so as to be able to overfly said terrain over the whole of said predetermined distance along said avoidance trajectory, independently of the performance of said aircraft.

In this first embodiment, advantageously:
in step c), at least one second limit slope corresponding to a maximum slope at which the aircraft can fly is moreover determined depending on predetermined flight conditions and actual performance of said aircraft. In this case, in a first variant embodiment, said predetermined flight conditions relate to normal operation of all the engines of the aircraft, whereas in a second variant embodiment, said predetermined flight conditions relate to an anticipated failure of an engine of the aircraft; and
in step d), at least one second characteristic sign which represents said second limit slope and which is also associated with said slope scale is presented on the viewing screen.

Thus, by virtue of said first and second characteristic signs, the pilot knows whether the slope which is requested of him (first characteristic sign) in order to overfly the terrain along the avoidance trajectory remains compatible with the best climb performance (second characteristic sign) in terms of slope which is available at any moment (depending on the actual performance of the aircraft), and this being either with all the engines operating, or by anticipation with one of the failed engines of said aircraft (which is of multi-engine type in this case).

In said first embodiment, in a preferred variant embodiment:
in step a), a plurality of avoidance trajectories each exhibiting a different turn is determined. The turns may be positive or negative, that is to say in one direction or the other. An avoidance trajectory can also exhibit a zero turn, the aircraft then flying straight ahead;
in step b), the profiles of the terrain under these avoidance trajectories are determined;
in step c), a plurality of first limit slopes associated respectively with said plurality of avoidance trajectories is determined; and
in step d), a plurality of first characteristic signs representing respectively said plurality of first limit slopes is presented on the viewing screen, said slope scale being presented vertically and said first characteristic signs being presented horizontally one alongside the other depending on the direction and the value of the corresponding turn.

Moreover, in this case, advantageously:
in step c), a plurality of second limit slopes associated respectively with said plurality of avoidance trajectories is determined; and in step d), a plurality of second characteristic signs representing respectively said plurality of second limit slopes is presented on the viewing screen, said second characteristic signs being presented horizontally one alongside the other depending on the direction and the value of the corresponding turn so that first and second characteristic signs which are associated with one and the same avoidance trajectory are situated horizontally at the same level.

Thus, a plurality of avoidance trajectories is proposed to the pilot, each of which has been associated with a first limit slope and possibly a second limit slope, thereby enabling the pilot to choose the best possible avoidance trajectory during an avoidance maneuver, while anticipating the configuration of the terrain that he will encounter along this chosen avoidance trajectory. Stated otherwise, the aid afforded by virtue of the present invention consists in particular in providing the pilot, instantaneously (or with a very short delay), with an indication of the best course to follow in low-altitude flight to protect himself from a threat that has just been detected and in confirming to him whether the performance of the aircraft allows this or that trajectory option.

Advantageously, the same number of avoidance trajectories exhibiting a turn to the right as avoidance trajectories exhibiting a turn to the left is determined.

Furthermore, advantageously:
  account is taken of a number of avoidance trajectories making it possible to obtain at least one first continuous curve connecting together said first characteristic signs; and/or
  account is taken of a number of avoidance trajectories making it possible to obtain at least one second continuous curve connecting together said second characteristic signs.

Additionally, in a second embodiment, said first limit slope corresponds to a maximum dive slope of the aircraft, at which it can descend before applying a full back stick climb with maximum power so as to be able to overfly said terrain. Moreover, advantageously, the first characteristic sign representing said first limit slope is suited to the profile of the terrain, while being limited, either by said profile of the terrain (upon the interception of said profile by this first characteristic sign), or by a predetermined value (in the absence of interception).

In this second embodiment, advantageously, when said first characteristic sign reaches the symbol illustrating the ground speed vector, an alert signal is emitted.

Furthermore, advantageously:
  in step c), the largest climb slope capable of being flown by the aircraft is moreover determined; and
  in step d), an auxiliary sign representing this largest climb slope is presented on the viewing screen.

Additionally, in this second embodiment, when the aircraft is turning:
  in step c), an auxiliary limit slope which corresponds to a maximum dive slope of the aircraft, at which it can descend before leveling out and then applying a full back stick climb with maximum power so as to be able to overfly said terrain is moreover determined; and
  in step d), an auxiliary sign representing this auxiliary limit slope is presented on the viewing screen.

Moreover, as a complement or supplement, when the aircraft is turning and it is impossible to level out the aircraft, a corresponding alert signal is emitted.

Furthermore, advantageously, when the aircraft is turning, a roll indication which indicates to the pilot the roll to be instructed so as to maintain a given trajectory is presented on the viewing screen.

Additionally, in a particular variant of said second embodiment:
  in step a), a plurality of avoidance trajectories each exhibiting a different turn is determined;
  in step b), the profiles of the terrain under these avoidance trajectories are determined;
  in step c), a plurality of first limit slopes associated respectively with said plurality of avoidance trajectories is determined; and
  in step d), a plurality of first characteristic signs representing respectively said plurality of first limit slopes are presented on the viewing screen, said slope scale being presented vertically and said first characteristic signs being presented horizontally one alongside the other depending on the direction and the value of the corresponding turn.

Regardless of the embodiment considered, said viewing screen is preferably a screen of a head-up viewing device. This is very advantageous since, in the case of an external threat, the pilot generally attempts to pilot the aircraft while continuing to look towards the external environment, outside the flight deck. Thus, the use of a head-up viewing device avoids the need for the pilot to have to look down at his flight instruments.

Furthermore, advantageously, it is possible to remove the presentation of the first characteristic signs presented in step d). This removal may be done automatically or manually, for example in the event of good visibility. Also, by way of example, the presentation may be limited to specific cases, for example in the case of poor visibility.

Furthermore, in a particular application which uses the aforesaid basic method and which is intended to automatically offer the pilot a routing:
  a score which relates to at least one predetermined criterion is determined for each avoidance trajectory (a lateral deviation with respect to a flight axis defined by two flight points, a minimized fuel consumption, etc.);
  the scores thus determined are compared with one another; and
  depending on this comparison, one of said avoidance trajectories is selected and highlighted.

Thus, by virtue of the preceding characteristics, the method in accordance with the invention is refined in such a way as to allow the determination of an optimal lateral trajectory (routing). Naturally, when the optimal trajectory is determined and followed by the aircraft, the basic method in accordance with the invention can continue to be implemented to aid the pilot to carry out an avoidance maneuver in the event of a sudden threat.

The present invention also relates to a system for aiding the piloting of an aircraft, for example a military transport plane, flying at low altitude.

According to the invention, said system is noteworthy in that it comprises:
  first means for determining at least one avoidance trajectory, at least over a predetermined distance ahead of the aircraft, said avoidance trajectory corresponding to a low-altitude lateral trajectory and exhibiting at least one lateral turn;
  second means for determining the profile of the terrain situated under this avoidance trajectory;
  third means for determining, depending on said profile of the terrain, at least one first limit slope corresponding to a slope that the aircraft must fly so as to be able to overfly said terrain over the whole of said predetermined distance along said avoidance trajectory; and display means for presenting, on a viewing screen, at least one first characteristic sign which represents said first limit slope and which is associated with a slope scale, with which is also associated a symbol illustrating the ground speed vector of the aircraft.

In a first embodiment, said third means are formed so as to determine a first limit slope which corresponds to a minimum slope that the aircraft must fly so as to be able to overfly said terrain over the whole of said predetermined distance along said avoidance trajectory, independently of the performance of said aircraft.

In this case, advantageously:
said system comprises, moreover, fourth means for determining at least one second limit slope corresponding to a maximum slope at which the aircraft can fly, depending on predetermined flight conditions and actual performance of said aircraft; and
said display means present, on the viewing screen, at least one second characteristic sign which represents said second limit slope and which is also associated with said slope scale.

Moreover, in a particular variant embodiment:
said first means determine a plurality of avoidance trajectories each exhibiting a different turn;
said second means determine the profiles of the terrain under these avoidance trajectories;
said third means determine a plurality of first limit slopes associated respectively with said plurality of avoidance trajectories; and
said display means present, on the viewing screen, a plurality of first characteristic signs representing respectively said plurality of first limit slopes, said slope scale being presented vertically and said first characteristic signs being presented horizontally one alongside the other depending on the direction and the value of the corresponding turn.

Furthermore, in a particular variant embodiment:
said fourth means determine a plurality of second limit slopes associated respectively with said plurality of avoidance trajectories; and
said display means present, on the viewing screen, a plurality of second characteristic signs representing respectively said plurality of second limit slopes, said second characteristic signs being presented horizontally one alongside the other depending on the direction and the value of the corresponding turn so that first and second characteristic signs which are associated with one and the same avoidance trajectory are situated horizontally at the same level.

Additionally, in a second preferred embodiment, said third means are formed so as to determine a first limit slope which corresponds to a maximum dive slope of the aircraft at which it can descend before applying a full back stick climb with maximum power so as to be able to overfly said terrain.

Furthermore, advantageously:
said display means comprise a head-up viewing device which comprises said viewing screen; and/or
said system comprises, moreover, control means making it possible to generate and to remove the presentation of the first characteristic signs on said viewing screen.

BRIEF DESCRIPTION OF THE DRAWINGS

The figures of the appended drawing will elucidate the manner in which the invention may be embodied. In these figures, identical references designate similar elements.

FIG. 2 shows pictures highlighting the essential characteristics of this first embodiment of the invention;
FIG. 3 shows a display implemented in accordance with this first embodiment of the invention;
FIG. 4 represents two illustrations making it possible to explain a particular mode of display;
and
FIG. 5 schematically illustrates a particular application of the present invention making it possible to find an optimal lateral trajectory.

FIGS. 6 and 7 make it possible to explain the essential characteristics of said second embodiment;
FIGS. 8 to 10 show various displays exhibiting particular characteristics;
and
FIG. 11 illustrates a picture similar to that or FIG. 2, but applied to said second embodiment.

DETAILED DESCRIPTION OF THE INVENTION

Figure 1:
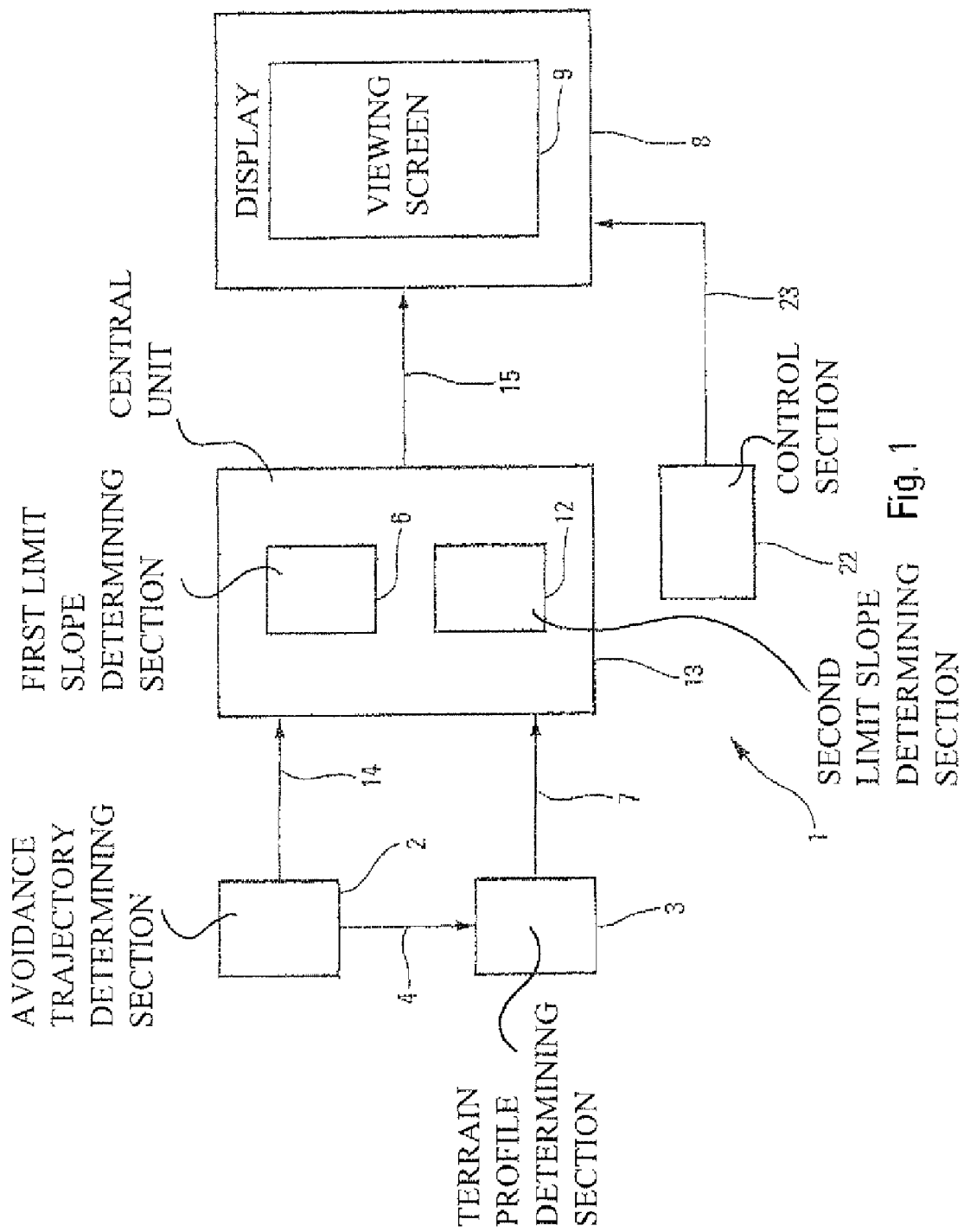
FIG. 1 is the schematic diagram of a device in accordance with the invention.

The system 1 in accordance with the invention and represented schematically in FIG. 1 is intended to aid a pilot of an aircraft A, for example a military transport plane, which is flying at low altitude, during the piloting of said aircraft A.

Within the framework of the present invention, the expression low-altitude flight is understood to mean a flight along a flight trajectory (at low altitude) enabling the aircraft A to follow as closely as possible the terrain 5 overflown, in particular so as to avoid being pinpointed. Such a flight trajectory at low altitude is generally situated at a predetermined terrain height, for example 500 feet (around 150 meters).

Figure 2:
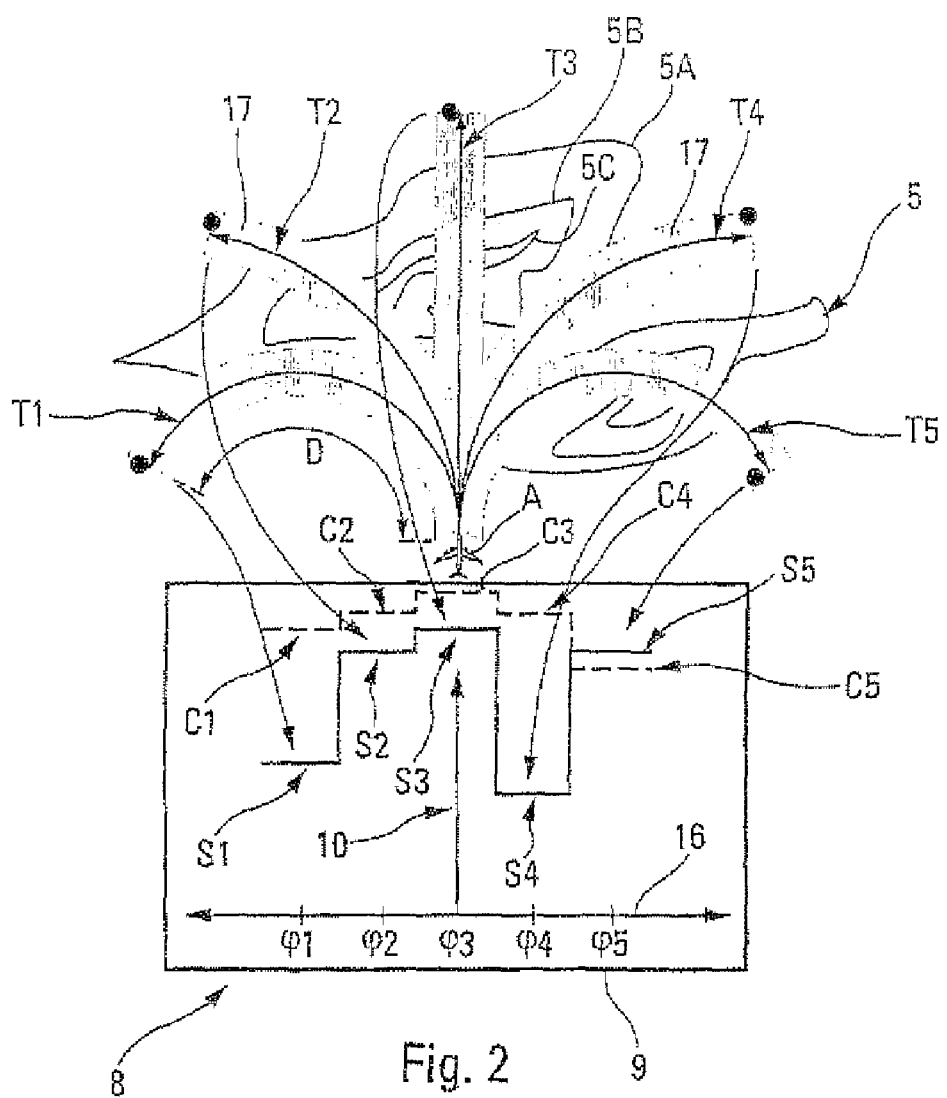
FIGS. 2 to 5 correspond to a first embodiment. More precisely.
Figure 3:
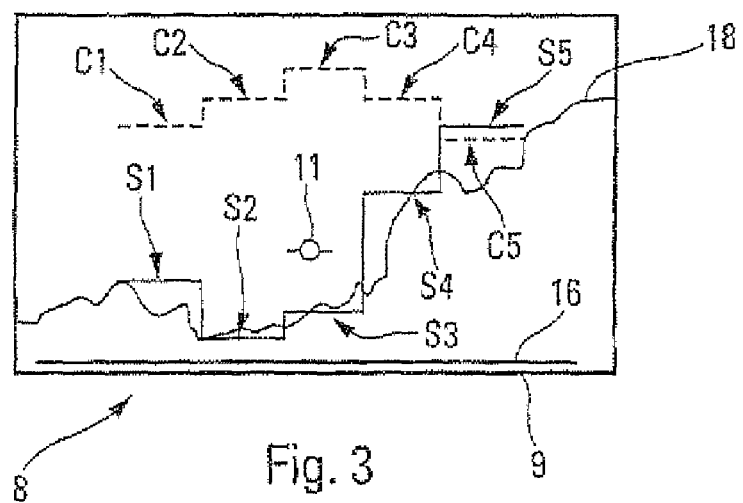

According to the invention, said system 1 comprises:
means 2 for determining at least one avoidance trajectory Ti, at least over a predetermined distance D ahead of the aircraft A. This avoidance trajectory Ti corresponds to a section of a low-altitude lateral trajectory;
means 3 which are connected by a link 4 to said means 2, for determining the profile of the terrain 5 which is situated under this avoidance trajectory Ti;
means 6 for determining, depending on said profile of the terrain received from said means 3 through a link 7, at least one first limit slope which corresponds to a slope that the aircraft A must fly so as to be able to overfly said profile of the terrain 5 over the whole of said predetermined distance D, along said avoidance trajectory Ti; and
display means 8 for presenting, on a viewing screen 9, at least one characteristic sign Si which represents said first limit slope and which is associated with a slope scale 10, with which is also associated a symbol 11 illustrating the ground speed vector of the aircraft A (FIGS. 2 and 3 for example).

Thus, the system 1 in accordance with the invention provides the pilot, at any moment and without any action on his part, with at least one avoidance trajectory Ti making it possible to carry out an avoidance (flight) maneuver, in particular in the event of a sudden threat, especially a ground-air threat. Such an avoidance trajectory Ti then enables the pilot to distance the aircraft A from the zone where this threat appears, while continuing to fly at low altitude (according to said avoidance trajectory Ti which is of the low-altitude type), doing so in complete safety since the pilot also knows the minimum slope (characteristic sign Si) at which he must fly the aircraft A in order to overfly the profile of the terrain 5 along said avoidance trajectory Ti.

It will be noted that said symbol 11 illustrating the ground speed vector provides the pilot with an indication as to the instantaneous ground slope of the aircraft A, as specified hereinbelow.

Furthermore, preferably, the viewing screen 9 of said display means 8 is a screen of a head-up viewing device, of the HUD type ("Head Up Display"). This is very advantageous since, during an external threat, the pilot generally attempts to pilot the aircraft A while continuing to look towards the external environment, outside of the flight deck. Thus, the use of a head-up viewing device avoids the need for the pilot, during such an external threat, to have to look down at his flight instruments in order to benefit from the aid afforded by the present invention.

It will be noted that the symbol 11 illustrating the ground speed vector, which is displayed on the head-up viewing screen 9, indicates the response of the aircraft A to the ground slope directive provided by a standard onboard guidance system (automatic pilot or flight director) or to the pilot directive in manual flight (with no automatic pilot, or flight director). The deviation between this ground speed vector and the inertial horizon (illustrated by a line 16 in FIGS. 2, 3 and 6 to 11) represents the instantaneous ground slope of the aircraft A. In FIGS. 3 and 6 to 9 is also represented the configuration of the relies 18 of the terrain 15 which is visible through said head-up viewing screen 9.

The system 1 in accordance with the invention comprises, moreover, control means 22 (manual or automatic) making it possible to generate and to remove the presentation of characteristic signs on said viewing screen 9 (via a link 23).

In a first embodiment represented in FIGS. 2 to 5, said third means 6 are formed so as to determine a first limit slope which corresponds to a minimum slope that the aircraft A must fly in order to be able to overfly said terrain 5 over the whole of said predetermined distance D along said avoidance trajectory T1 to T5, independently of the performance of said aircraft A.

In this case, advantageously:
 said system 1 comprises, moreover, means 12 for determining at least one second limit slope corresponding to a maximum slope at which the aircraft A can fly, depending on predetermined flight conditions and actual performance of said aircraft A; and
 said display means 8 present, on the viewing screen 9, a characteristic sign Ci which represents said second limit slope and which is also associated with said slope scale 10.

In this case, in a first embodiment, said predetermined flight conditions relate to normal operation of all the engines of the aircraft A [AEO conditions ("All Engine Operative")], whereas in a second embodiment, said predetermined flight conditions relate to a failure of an engine of the aircraft [OEI conditions ("One Engine Inoperative")] which is therefore of the multi-engine type.

It is also possible to provide means (not represented) for switching, automatically or manually, from OEI conditions to AEO conditions, and vice versa. It is also conceivable to provide simultaneously on one and the same viewing screen 9 at least one pair of different characteristic signs Ci, corresponding respectively to the two conditions OEI and AEO.

Thus, by virtue of said characteristic signs Si and Ci, the pilot knows whether the slope which is requested of him (characteristic sign Si) in order to overfly the profile of the terrain 5 along the avoidance trajectory Ti remains compatible with the best actual climb performance (characteristic sign Ci) in terms of slope, and this being either with all the engines operating, or with one of the failed engines of said aircraft A (which is of multi-engine type in this case).

It will be noted that the concept of (total) slope taken into account is equivalent to the concept of total energy, that is to say to a concept which is representative of what the maximum total energy of the aircraft A would be either with a failed engine (OEI conditions) or with all the engines operating (AEO conditions).

Naturally, the slope information (or total energy information) must take account of (possible) changes of course such as provided for by the avoidance trajectory Ti, since the climb performance is impaired by the presence of a turn (precisely by the load factor induced).

It will be noted that, for an aircraft A exhibiting the inertia of a slow or heavy tactical transport plane, it is necessary to take account of the actual performance. By taking the total energy into account it is possible to derive maximum profit from the performance of the aircraft A, assuming a transfer of energy from kinetic energy to potential energy (reduction in speed for a gain in flyable slope), this assuming a calculation of maximum slope at a speed of best slope. Furthermore, taking the slope into account enables best use to be made of the relevant display of a head-up viewing screen 9 superimposed on the landscape seen by the pilot, as specified hereinbelow. Moreover, the influence of an engine failure is very sensitive as regards the climb performance of the aircraft A, thus highlighting the benefit of being able to take the OEI conditions into account by anticipation, even if the aircraft A is traveling with all the engines operating.

In the particular embodiment represented in FIG. 1, the means 6 and 12 are integrated into a central unit 13 which is connected by links 14 and 15 respectively to the means 2 and to the display means 8.

In a particular embodiment:
 said means 2 determine a plurality of avoidance trajectories Ti (i going from 1 to n, n being an integer greater than 1) each exhibiting a different turn $\phi i$ (which may be negative, positive or zero);
 said means 3 determine the various profiles of the terrain 5 under all these avoidance trajectories Ti;
 said means 6 determine a plurality of first limit slopes associated respectively with said plurality of avoidance trajectories Ti; and
 said display means 8 present, on the viewing screen 9, a plurality of characteristic signs Si representing respectively said plurality of first limit slopes. The slope scale 10 is presented vertically as represented in FIG. 2 (where n is equal to 5) and said characteristic signs S1, S2, S3, S4, S5 are presented horizontally one alongside the other depending on the direction and the value of the corresponding turn $\phi i$ ($\phi 1$, $\phi 2$, $\phi 3$, $\phi 4$, $\phi 5$). In this example, $\phi 3$ is considered to be zero (flying straight ahead), $\phi 1$ and $\phi 2$ are negative (turn to the left) and $\phi 4$ and $\phi 5$ are positive (turn to the right).

Furthermore, in a particular embodiment:
 said means 12 determine a plurality of second limit slopes associated respectively with said plurality of avoidance trajectories Ti; and
 said display means 8 present, on the viewing screen 9, a plurality of characteristic signs Ci (C1, C2, C3, C4 and C5 in FIGS. 2 and 3) representing respectively said plurality of second limit slopes. Said characteristic signs Ci (C1 to C5) are presented horizontally one alongside the other depending on the direction and the value of the corresponding turn $\phi i$ so that characteristic signs Si and Ci (for example S2 and C2) which are associated with one and the same avoidance trajectory Ti (T2 in this example) are situated horizontally at the same level (at the level of the turn $\phi 2$ for the example considered). Moreover, preferably, the characteristic signs Ci and Si all have the same width.

Laterally, the avoidance trajectories Ti must take account of a corridor 17 defined on either side, so as to allow for errors related to the onboard systems of the aircraft A.

The maximum number of trajectories Ti that can be calculated depends on the calculation performance of the onboard means 2. When the number n of trajectories increases, the total configuration of the relief is approached, to within the smoothing effect due to the terrain extraction principle (scanning around the aircraft A with fewer and fewer discontinuities).

When the aircraft A moves, the terrain 5 is extracted with the aid of the means 3, in tandem with this movement, along the corridor 17 of each predefined avoidance trajectory Ti. A terrain profile is then available to the central unit 13 for each avoidance trajectory Ti.

Figure 5:
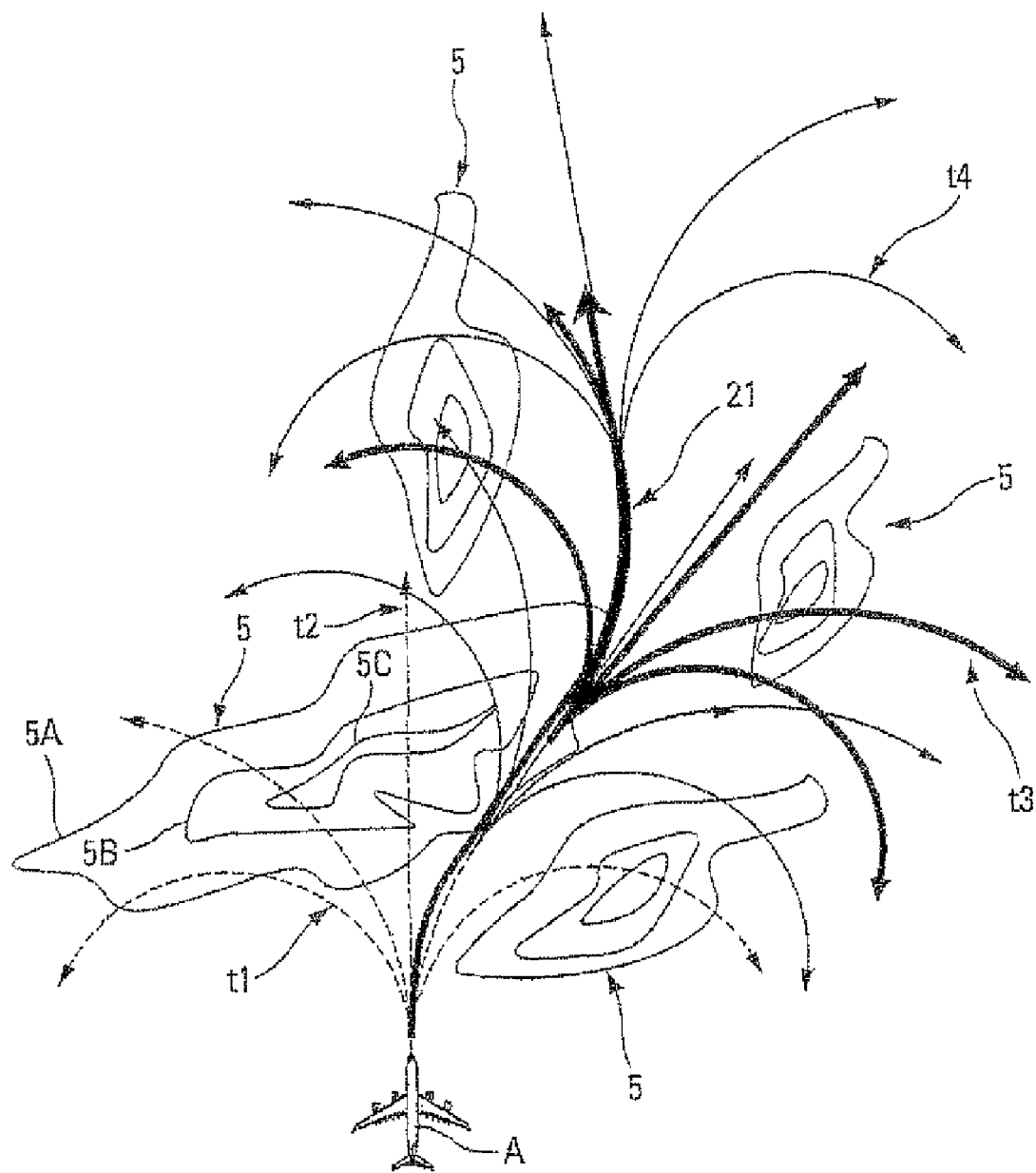

It will be noted that the means 3 intended to determine and to provide the individual profiles of the terrain, for each avoidance trajectory Ti comprises a standard means that knows the general profile of the whole of the terrain 5 (various heights of which have been portrayed, with the aid of zones 5A, 5B and 5C, in FIGS. 2 and 5). This standard means may be an onboard numerical database containing this general profile, or a device, such as a radar in mapping mode for example, which formulates said profile onboard the aircraft A.

When an air-ground threat appears unexpectedly, it is beneficial for the distance (or the depth) D to allow a modification of course (or of heading) of at least 90° on each side. However, a viewing screen 9 of head-up type exhibits an angular aperture which is less than this value (generally 20° as against the 180° required). However, it is not vital to render the display of the various avoidance trajectories Ti consistent in the lateral plane. What is important is that the pilot knows which course to take depending on the most suitable terrain configuration. Thereafter, the pilot will anyway fly the aircraft A in the appropriate direction, thereby rendering lateral consistency non-essential, what is important then lying along the course followed.

Also, preferably, the lateral consistency of the depiction of the estimated maximum slope degrades on diverging laterally from the ground speed vector, but it is perfect for the part representing the slope on the trajectory with zero turn $\phi$ ($\phi 3$ for the example of FIG. 2). This display turns in any manner at the same time as the aircraft A, when the latter turns towards the chosen trajectory.

Moreover, as an aid to piloting, the display in accordance with the invention is used rather more in poor visibility conditions, so that it is less necessary for certain displayed head-up information (first limit slopes) to be superimposed on the terrain.

Vertical consistency, for all the lateral trajectories envisaged, is essential since the display relates to ground slopes. So, the total slopes and the trajectories are given with respect to the ground, and an additional load factor enables the impact due to turns to be taken into account.

FIG. 2 gives a glimpse of the display (in accordance with the invention) that can be viewed on the screen 9 of head-up type (depending on the various trajectories that may be envisaged n=5). The characteristic signs Si and Ci illustrating the information regarding necessary slopes to fly (to avoid the relief) and slopes that can be flown by the aircraft (altered by a turn in the case of those which are not aligned with the speed vector) may respectively be designated by the terms floor reticle (characteristic sign Si) and ceiling reticle (characteristic sign Ci).

These ceiling and floor reticles (or characteristic signs) Ci and Si are positioned as follows:

the origin of the reference system of these reticles is the course of the aircraft (100 3=0);

vertically, the height of each reticle is positioned at $G\upsilon \cdot \gamma$ mrd ($\gamma$ being the corresponding slope) with respect to the origin of the viewing screen 9 (inertial horizon 16). If the slope calculated is negative, the reticle is positioned under the inertial horizon 16; and laterally, the middle of a reticle is positioned at $GL \cdot \phi$ mrd with respect to the course of the aircraft ($\phi 3$).

The gains $G\upsilon$, $GL$ and the width of each reticle Ci, Si are determined in such a way as to obtain easy steering of the speed vector. Preferably, the gain $G\upsilon$ is equal to 1 to obtain a strictly consistent vertical display, that is to say one which conforms with the angles as regards reality.

Consequently, the pilot must keep the ground speed vector (symbol 11) between the ceiling and floor reticles Ci and Si so as to be able to turn with a given load factor above the terrain 5, while remaining within the limits of the actual performance of the aircraft A. The condition for this is obviously that the ceiling reticle Ci is above the floor reticle Si (which is the case for turns $\phi 1$ to $\phi 4$ in FIGS. 2 and 3). In the converse case (C5 below S5 in FIGS. 2 and 3), the slope required to negotiate the terrain 5 is too high with respect to the performance of the aircraft A.

It will be noted that if a cliff is present on one side, it is possible to provide for a gain $G\upsilon$ on the slopes displayed such that the floor reticles Si leave the viewing screen 9 through the top, thereby deterring the pilot from placing the symbol 11 of the speed vector of the aircraft A above these floor reticles Si.

The number of lateral trajectories Ti when turning, as well as the depth D of these trajectories Ti depend greatly on the calculational capabilities of the system 1, as well as the plotting performance of the viewing screen 9. The processing that requires the most calculational resources is the extraction (implemented by the means 3) of the data of the terrain 5. It is therefore important to minimize the extractions of the terrain 5.

Figure 4:
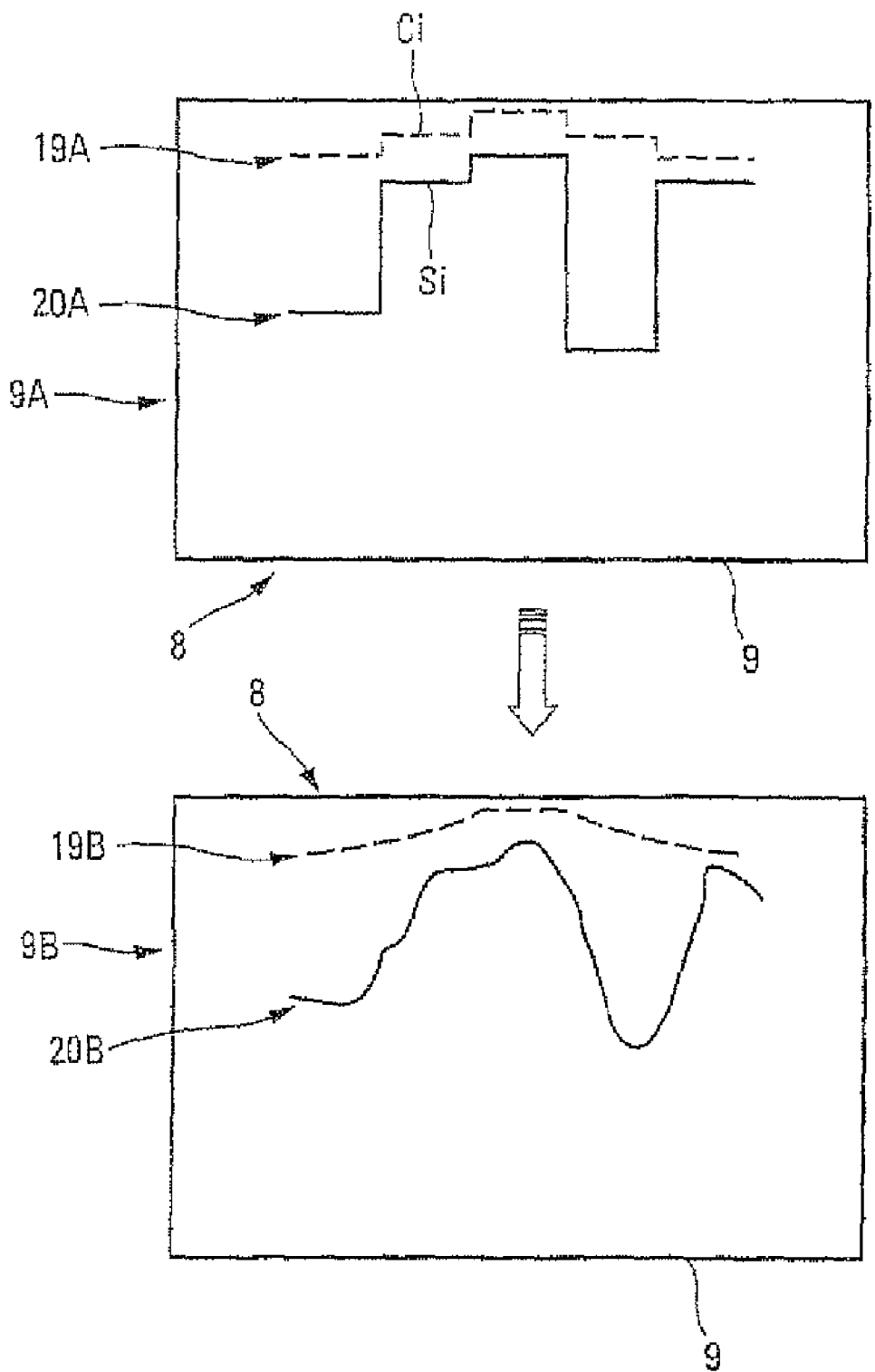

Additionally, it will be noted that when n is very large, necessarily the width of each reticle or characteristic sign Ci, Si is very small. In this case, the slope profiles displayed tend towards a filtered terrain profile around the aircraft A (as represented in the illustration 9B of FIG. 4, compared with the illustration 9A where n=5). Curves 19A and 20A furnished with reticles Si and Ci are then replaced with curves 19B and 20B which are smoothed.

Consequently, by virtue of the invention, when the aircraft A follows an initial low-altitude flight plan, the system 1 continuously calculates one or more avoidance trajectories Ti which correspond to one or more turns $\phi i$, generally in equal number on either side of the current course of the aircraft A. The system 1 makes it possible to anticipate the configuration of the terrain 5 along these avoidance trajectories Ti and to indicate whether the actual performance achievable by the aircraft A enables the relief to be crossed. For performance reasons (limitation of the calculation time, and hence minimization of the lag in the availability of each trajectory), said avoidance trajectories Ti are all calculated over a given length (or depth) D. The system 1 thereafter calculates the energies (total slopes) for this set of lateral trajectories Ti (which permit avoidance maneuvers) and presents a sufficiently explicit state on the viewing screen 9 of head-up type, so as to provide the pilot, instantaneously (or with a very short lag), with an indication of the best course to take in low-altitude flight to protect himself from a detected threat.

In a particular application relating to routing, the successive continuous profiles can be used to calculate a low-altitude flight profile over a certain depth in front of the aircraft A, by searching for troughs (valleys) of the terrain 5 on either side of the course of the aircraft A.

In general, an aircraft starts from a point B1 in order to go towards a point B2. When flying at constant altitude, the straight line is obviously the most direct trajectory which minimizes the journey time and the fuel consumption. When flying at low altitude, the pilot can go from the point B1 to the point B2 while avoiding the need to fly above peaks, hence by following the valleys, this not necessarily representing the shortest path, but the one which enables him to benefit from the most effective possible terrain masking.

The choice to follow this or that valley, hence the choice of the longitudinal progress of the aircraft A, is made automatically by virtue of an expert system which evaluates the combinations of possible trajectories over a certain depth of trajectory in front of the aircraft A.

A scoring system makes it possible to automatically determine one direction rather than another. A score taken into account by this scoring system may depend on the distance away from the direct trajectory, on the additional fuel consumption and the effectiveness of the trajectory in terms of terrain masking (effectiveness calculated with the help of a digital terrain database, by calculating for example the number of points of the surrounding terrain which see the trajectory in optical range).

The advantage of this solution is that the trajectory is then optimized in both dimensions. The expert system and the scoring system which are not represented form part of said system 1 in accordance with the invention.

In the example of FIG. 5, it is seen that the aircraft A can fly in a trough on the right without departing too far from the current course. The expert system verifies over a certain depth in front of the aircraft A that this solution is actually better in the short term than the left one.

Illustrated in FIG. 5 are the various avoidance trajectories Ti at various successive times t1, t2, t3 and t4 (or iterations). The resulting trajectory corresponds to the thick line central trajectory 21.

This particular application which utilizes part of the aforesaid basic method, only makes it possible to automatically propose an optimal lateral trajectory (routing), depending on the terrain for joining a point B1 to a point B2. Once the pilot chooses to follow this new trajectory which is then the reference trajectory, the basic method implemented by the system 1 (ceiling and/or floor reticles) is still available to him should he need to perform an avoidance maneuver, for example on account of the sudden and unexpected appearance of an air-ground threat.

Additionally, in a second preferred embodiment represented in FIGS. 6 to 11, said means 6 are formed so as to determine a first limit slope θmin which corresponds to a maximum dive slope of the aircraft A at which it can descend before applying a full back stick climb with maximum power so as to be able to overfly said terrain 5 in front of it.

Such a maneuver with full back stick FBS climb with maximum power of TOGA ("Take-Off/Go-Around") type, that is to say maximum thrust at takeoff or overshoot) corresponds to the maneuver where the pilot pulls the control stick hard back and applies maximum power to the aircraft A. It is known that such a maneuver does not make it possible to climb at the maximum slope that the aircraft A can achieve, but for the pilot such a maneuver represents the emergency maneuver which is the simplest and most intuitive to perform.

Figure 6:
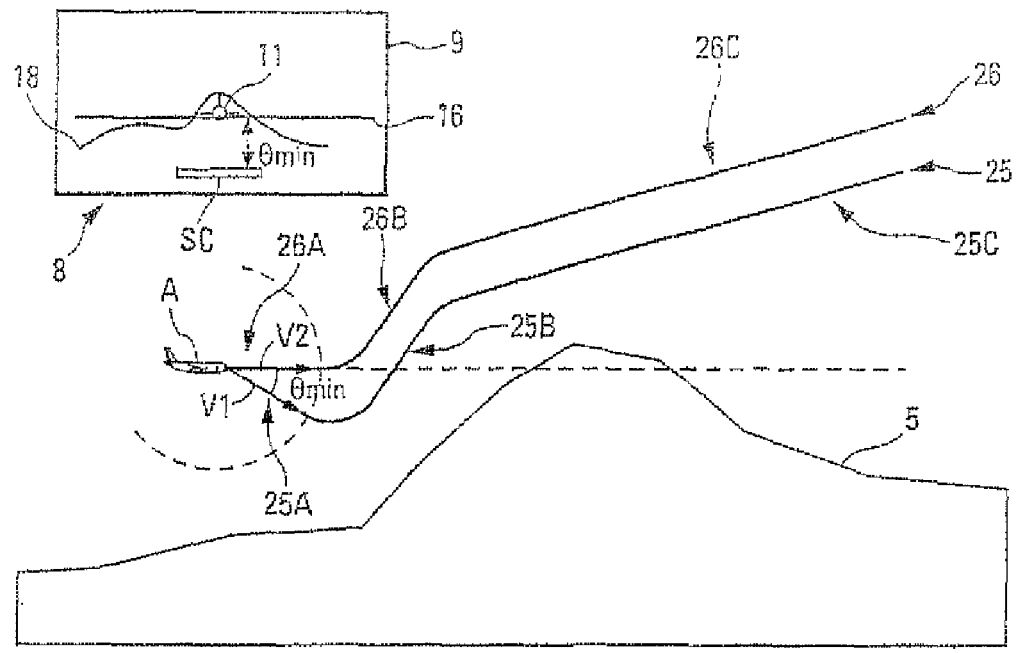
FIGS. 6 to 11 correspond to a second embodiment. More precisely.

In this second embodiment, the display means 8 therefore present on the viewing screen 9 a characteristic sign SC which represents said limit slope θmin, as represented in FIG. 6.

Figure 7:
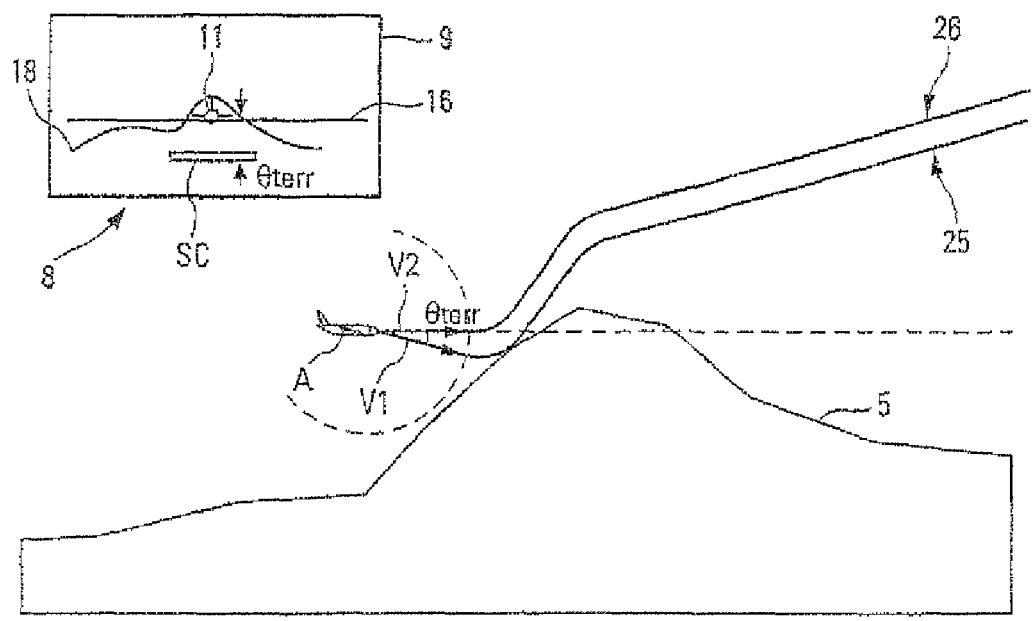

According to the invention, the means 6 use a test element 25 which makes it possible to test the crossing capabilities of the aircraft A with the aforesaid maneuver and which consists, as represented in FIGS. 6 and 7:

of a straight segment 25A illustrated by a vector V1 which exhibits an angle θmin with respect to the current speed vector V2 of the aircraft A, and whose length is representative of a predetermined flight duration;

a vertical resource part 25B; and a segment 25C of full back stick climb with maximum power.

The total length of the test element 25 must make it possible to anticipate problems with sufficient notice (of the order of a few nautical miles for a tactical transport plane of A400M type). The test element 25 therefore provides the maximum avoidance capability for the instantaneous speed vector if the aircraft A descended at θmin degrees under the current speed vector V2. Also represented in FIGS. 6 and 7 is a test element 26 comprising parts 26A, 26B and 26C that are similar to said parts 25A, 25B and 25C, but where the part 26A illustrates said current speed vector V2. This test element 26 therefore provides the maximum avoidance capability for the instantaneous speed vector. Naturally, this test element 26 must not pass through the profile of the terrain 5 (at worst, it can come into contact with the latter).

The characteristic sign SC thus determined is saturated towards the bottom, when the test element 25 does not intercept any element of the terrain 5. In this case, the angle θmin exhibits a predetermined value, for example −14° for a military transport plane of A400M type.

Figure 8:
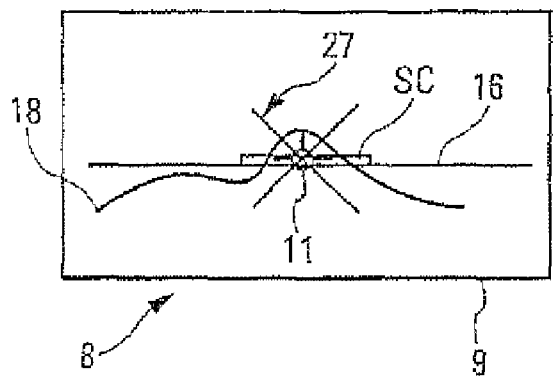

On the other hand, when the test element 25 intercepts the terrain 5, as represented in FIG. 7, said test element 25 as suited to said profile of the terrain 5. An angle θterr between the characteristic sign SC and the symbol 11 (illustrating the ground speed vector of the aircraft A) is thus obtained which is less than the aforesaid minimum slope θmin. In such a situation, as the characteristic sign SC approaches the symbol 11 and as the margin decreases, the pilot must pull on the control stick in order to always keep the characteristic sign SC below said symbol 11 so as to be able to pass the obstacle in front of him. Such a maneuver is possible up to the moment at which the characteristic sign SC arrives level with the symbol 11. When such a limit situation is reached, the device 1 emits an alert signal, for example by way of the display of a particular indication means 27 on the viewing screen 9. This indication means 27 can correspond to a disengagement cross as represented in FIG. 8. It may also be an alert message, a flashing reticle or a disengagement arrow for example. In an extreme situation such as this, the aircraft A is still able to cross the relief, if the pilot applies a full back stick climb with maximum power, such as stated earlier.

On the other hand, if in an extreme situation such as this, the pilot does not pull on the control stick, the characteristic sign SC will pass above the symbol 11, thus signifying that the aircraft A will no longer be able to cross the relief in front of it, at least with the expected margin. The pilot must then modify the lateral trajectory in order to be able to overfly the relief.

It will be noted that, during an avoidance maneuver of FBS/TOGA type, the descent margin begins to grow as the obstacle is overflown. In such a situation, it is advisable to maintain the FBS/TOGA maneuver for a minimum time so as to avoid jerky piloting which would induce a succession of alerts each time the pilot eases off.

Figure 9:
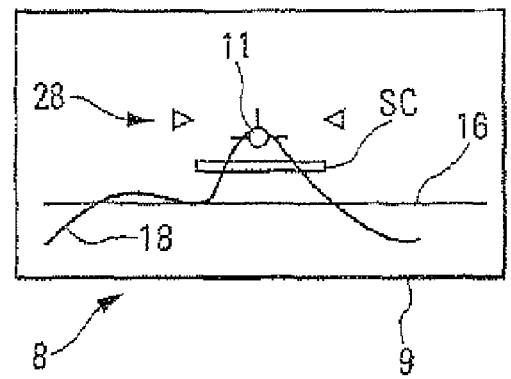

In a particular embodiment:

said means 6 moreover determine a climb slope which corresponds to the largest climb slope capable of being flown by the aircraft A, either with all the engines operating, or with a failed engine; and said display means 8 present on the viewing screen 9, as represented in FIG. 9, an auxiliary sign 28 which represents on the slope scale of the viewing screen 9 this largest climb slope.

This particular embodiment enables the pilot to clearly see the climb margins remaining, for example by comparing the characteristic sign SC and said auxiliary sign 28.

Consideration is now given to the case where the aircraft A is flying a turn.

In this case, the pilot must be conscious of what would happen if he were to continue on the current trajectory, or should it be impossible to maintain this current trajectory, what would happen on a level-out trajectory before a vertical resource at maximum thrust.

Protection with respect to the terrain is then ensured on a trajectory extrapolated on the basis of the current roll of the aircraft A (possibly filtered), as well as on a trajectory extrapolated with the assumption of a level-out before the FBS/TOGA maneuver. This second trajectory is not normal to the current trajectory of the aircraft A, and it exhibits a deviation with respect to this normal on account of the time required to level out the wings. In this case:

the central unit 13 determines, moreover, an auxiliary limit slope which corresponds to a maximum dive slope of the aircraft A, at which it can descend before leveling out, then applying a full back stick climb of FBS type with maximum power of TOGA type so as to be able to overfly said terrain 5. The vertical trajectory is calculated in the same way for a turning case and for a level-out case; and the display means 8 present on the viewing screen 9 an auxiliary sign 29 representing this auxiliary limit slope, as represented in FIG. 10.

Figure 10:
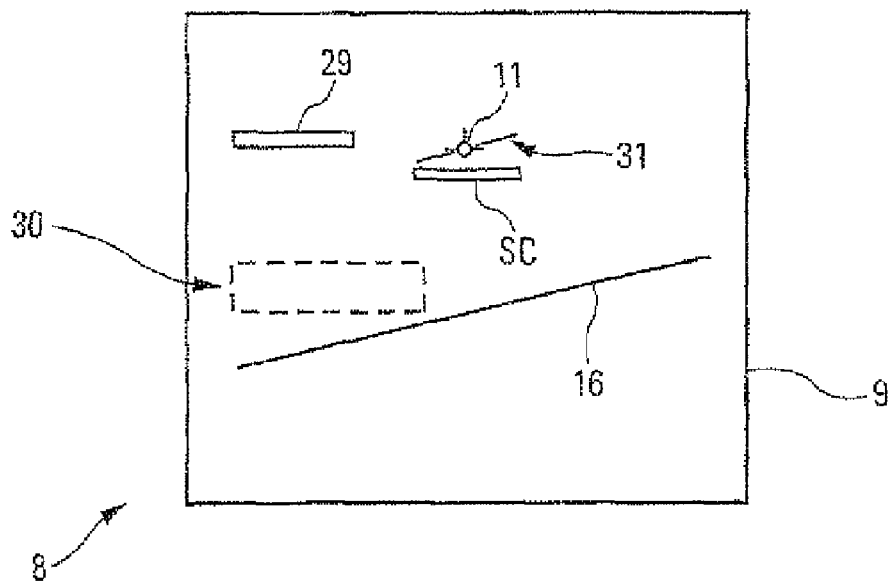

Instead of presenting said auxiliary sign 29 relating to a level-out trajectory, it may be sufficient to emit an alert signal (for example in the form of a message which is, for example, written in a rectangle 30 represented by dashes in FIG. 10) when it is impossible to level out, if the auxiliary sign 29 were to pass above the symbol 11. This latter embodiment makes it possible to simplify the display of the viewing screen 9.

During low-altitude flight under manual piloting, the aircraft A threads its way through the valleys so as to profit from the terrain masking, for example in relation to any ground-air threats. So, when the pilot turns the aircraft A because he is facing a relief, the avoidance maneuver with level out is often impossible. In this case, if an alarm is emitted relating to the current trajectory of the aircraft A:

either the pilot makes the aircraft A climb, and in this case the terrain masking may no longer be effective;

or if he wants to remain as close as possible to the ground, he modifies the turn according to the possibilities of the terrain configuration, that is to say:

either he increases the roll of the aircraft A, that is to say he tightens the turn;

or, if the roll is already large, he widens the turn.

However, a change of trajectory calls into question the presence or absence of an alert, and the pilot may then equally find himself in a better situation as in a worse situation than initially.

Figure 11:
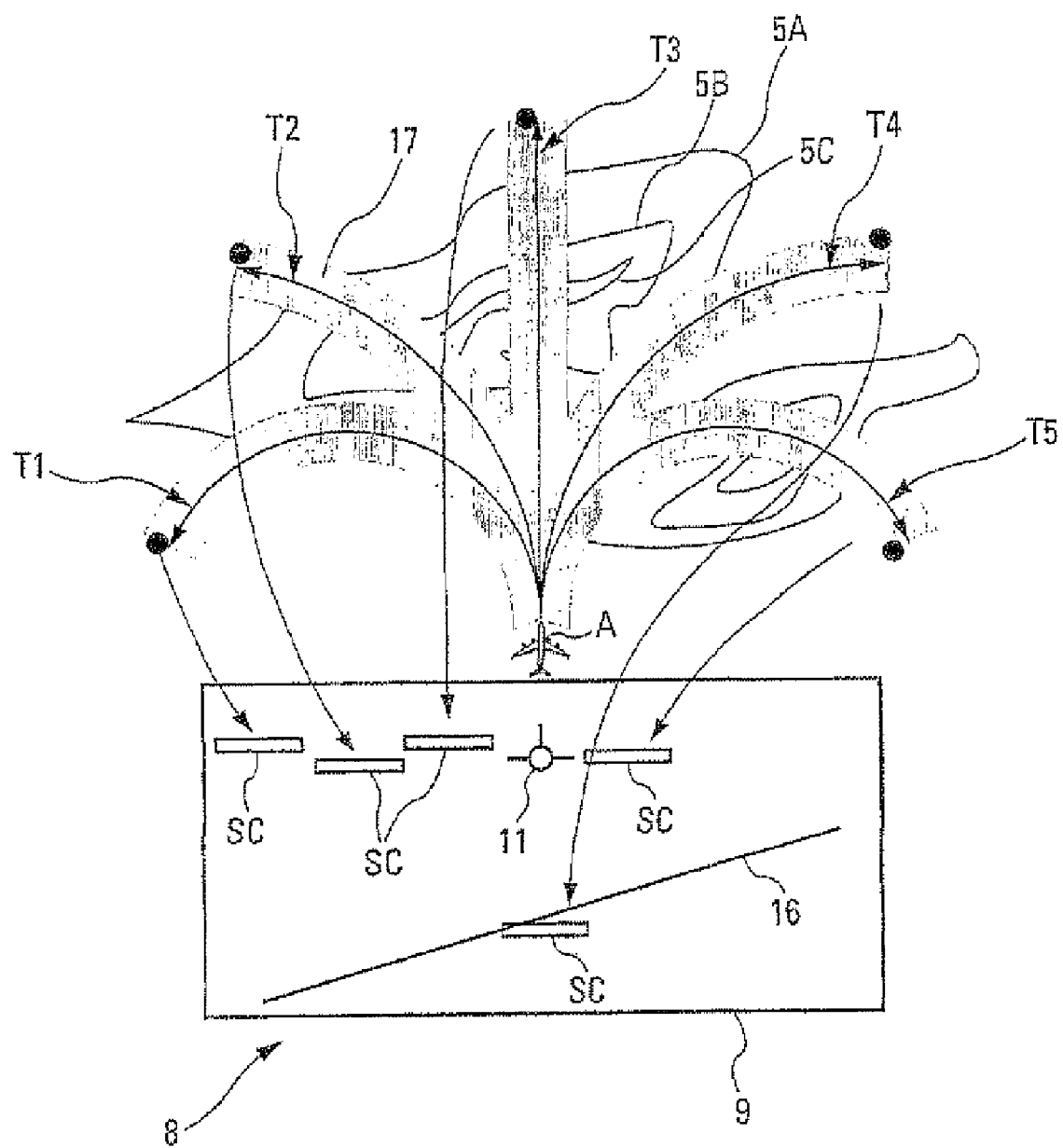

So, to remedy this drawback, the number of trajectories over which the ground protection is calculated and verified is increased, as represented in FIG. 11 by way of example.

The situation of FIG. 11 is similar to that of FIG. 2, but relates to said second embodiment. In this case, a characteristic sign SC is calculated for each of the trajectories T1 to T5, knowing that the characteristic sign SC situated under the symbol 11 is the one which is calculated for the current trajectory, in this instance the trajectory T4. These characteristic signs SC therefore move laterally over the viewing screen 9 depending on the roll applied to the aircraft A. It is therefore sufficient to extract the terrain along each trajectory over a corridor 17 which depends in particular on the quality of navigation of the aircraft A.

It will be noted that in a straight line or a turn, the characteristic signs SC situated on either side of the characteristic sign SC tied to the symbol 11 provide information about the terrain around the aircraft A. The roll directive is therefore known in advance by the pilot. If he wishes to change trajectory by tightening or loosening his turn from she current trajectory T4, the symbol 11 will, following she action of the roll of the pilot, position itself in relation to the characteristic sign SC which corresponds to the instructed roll.

Within the framework of the present invention, when an alert is emitted in relation to the current trajectory, the pilot therefore has the choice:

of climbing along the current lateral trajectory; or of leveling the wings out and climbing; or of remaining as low as possible while tightening or widening his turn.

This last possibility induces a modification of the current turning trajectory. The alert may disappear depending on the configuration of the terrain or else get worse. So, a horizontal display of the terrain, for example on a navigation screen, can aid the pilot in choosing a new lateral trajectory, but this procedure requires good anticipation of the terrain, which is not necessarily easy since such a display has to be of the head-up type. Moreover, this display gives no indication regarding the capability in terms of performance of the aircraft A to cross the relief. So, in such a situation, the embodiment represented in FIG. 11 comprising a plurality of trajectories affords the pilot easy piloting, since relevant information is already present on the head-up viewing screen 9.

Additionally, if the pilot decides to follow the trajectory for which an alert has been emitted, he cannot simply maintain the initial roll during the climb, since the turning radius would vary at constant roll during this climb. In such a situation, a roll indication 31 is moreover presented on the viewing screen 9, as is represented in FIG. 10, which indicates to the pilot the roll to be instructed in order to maintain a given trajectory.

The invention claimed is:

1. A method of aiding the piloting of an aircraft flying at low altitude, wherein the following operations are carried out in an automatic and repetitive manner:

a) determining at least one avoidance trajectory, at least over a predetermined distance ahead of the aircraft, said avoidance trajectory corresponding to a low altitude lateral trajectory and exhibiting at least one lateral turn;

b) determining the profile of the terrain situated under this avoidance trajectory;

c) determining at least one first limit slope corresponding to a slope that the aircraft must fly so as to be able to overfly said terrain over the whole of said predetermined distance along said avoidance trajectory depending on said profile of the terrain; and d) presenting to a pilot, on a viewing screen, at least one first characteristic sign which represents said first limit slope and which is associated with a slope scale, with which is also associated a symbol illustrating the ground speed vector of the aircraft.

2. The method as claimed in claim 1, wherein said first limit slope corresponds to a minimum slope that the aircraft must fly so as to be able to overfly said terrain over the whole of said predetermined distance along said avoidance trajectory, independently of the performance of said aircraft.

3. The method as claimed in claim 2, wherein:
in step a), a plurality of avoidance trajectories each exhibiting a different turn is determined;
in step b), the profiles of the terrain under these avoidance trajectories are determined;
in step c), a plurality of first limit slopes associated respectively with said plurality of avoidance trajectories is determined; and
in step d), a plurality of first characteristic signs representing respectively said plurality of first limit slopes is presented on the viewing screen, said slope scale being presented vertically and said first characteristic signs being presented horizontally one alongside the other depending on the direction and a value of the corresponding turn.

4. The method as claimed in claim 3, wherein, moreover:
in step c), a plurality of second limit slopes associated respectively with said plurality of avoidance trajectories is determined; and
in step d), a plurality of second characteristic signs representing respectively said plurality of second limit slopes is presented on the viewing screen, said second characteristic signs being presented horizontally one alongside the other depending on the direction and a value of the corresponding turn so that first and second characteristic signs which are associated with one and the same avoidance trajectory are situated horizontally at the same level.

5. The method as claimed in claim 3, wherein the same number of avoidance trajectories exhibiting a turn to the right as avoidance trajectories exhibiting a turn to the left is determined.

6. The method as claimed in claim 3, wherein account is taken of a number of avoidance trajectories making it possible to obtain at least one first continuous curve connecting together said first characteristic signs.

7. The method as claimed in claim 4, wherein account is taken of a number of avoidance trajectories making it possible to obtain at least one second continuous curve connecting together said second characteristic signs.

8. The method as claimed in claim 3, wherein:
a score which relates to at least one predetermined criterion is determined for each avoidance trajectory;
the scores thus determined are compared with one another; and
depending on this comparison, one of said avoidance trajectories is selected and highlighted.

9. The method as claimed in claim 1, wherein said first limit slope corresponds to a maximum dive slope of the aircraft, at which the aircraft descends before applying a full back stick climb with maximum power so as to be able to overfly said terrain.

10. The method as claimed in claim 9, wherein, when said first characteristic sign reaches the symbol illustrating the ground speed vector, an alert signal is emitted.

11. The method as claimed in claim 8, wherein:
in step c), the largest climb slope capable of being flown by the aircraft is moreover determined; and
in step d), an auxiliary sign representing this largest climb slope is presented on the viewing screen.

12. The method as claimed in claim 9, wherein, when the aircraft is turning:
in step c), an auxiliary limit slope which corresponds to a maximum dive slope of the aircraft, at which the aircraft descends before leveling out and then applying a full back stick climb with maximum power so as to be able to overfly said terrain is moreover determined; and
in step d), an auxiliary sign representing this auxiliary limit slope is presented on the viewing screen.

13. The method as claimed in claim 9, wherein, when the aircraft is turning and it is impossible to level out the aircraft, a corresponding alert signal is emitted.

14. The method as claimed in claim 9, wherein, when the aircraft is turning, a roll indication which indicates to the pilot a roll to be instructed so as to maintain a given trajectory is presented on the viewing screen.

15. The method as claimed in claim 9, wherein:
in step a), a plurality of avoidance trajectories each exhibiting a different turn is determined;
in step b), the profiles of the terrain under these avoidance trajectories are determined;
in step c), a plurality of first limit slopes associated respectively with said plurality of avoidance trajectories is determined; and
in step d), a plurality of first characteristic signs representing respectively said plurality of first limit slopes are presented on the viewing screen, said slope scale being presented vertically and said first characteristic signs being presented horizontally one alongside the other depending on the direction and a value of the corresponding turn.

16. The method as claimed in claim 1, wherein said viewing screen is a screen of a head up viewing device.

17. The method as claimed in claim 1, wherein it is possible to remove the presentation of the first characteristic sign presented in step d).

18. A system for aiding the piloting of an aircraft flying at low altitude, wherein it comprises:
a first determining section that determines at least one avoidance trajectory, at least over a predetermined distance ahead of the aircraft, said avoidance trajectory corresponding to a low altitude lateral trajectory and exhibiting at least one lateral turn;
a second determining section that determines the profile of the terrain situated under this avoidance trajectory;
a third determining section that determines, depending on said profile of the terrain, at least one first limit slope corresponding to a slope that the aircraft must fly so as to be able to overfly said terrain over the whole of said predetermined distance along said avoidance trajectory; and
a display that presents, on a viewing screen, at least one first characteristic sign which represents said first limit slope and which is associated with a slope scale, with which is also associated a symbol illustrating the ground speed vector of the aircraft.

19. The system as claimed in claim 18, wherein said first limit slope corresponds to a minimum slope that the aircraft must fly so as to be able to overfly said terrain over the whole of said predetermined distance along said avoidance trajectory, independently of the performance of said aircraft.

20. The system as claimed in claim 19, wherein:
said system comprises, moreover, a fourth determining section that determines at least one second limit slope corresponding to a maximum slope at which the aircraft flies, depending on predetermined flight conditions and actual performance of said aircraft; and
said display presents, on the viewing screen, at least one second characteristic sign which represents said second limit slope and which is also associated with said slope scale.

21. The system as claimed in claim 19, wherein:
said first determining section determines a plurality of avoidance trajectories each exhibiting a different turn;
said second determining section determines the profiles of the terrain under these avoidance trajectories;
said third determining section determines a plurality of first limit slopes associated respectively with said plurality of avoidance trajectories; and
said display presents, on the viewing screen, a plurality of first characteristic signs representing respectively said plurality of first limit slopes, said slope scale being presented vertically and said first characteristic signs being presented horizontally one alongside the other depending on the direction and a value of the corresponding turn.

22. The system as claimed in claim 21, wherein:
said fourth determining section determines a plurality of second limit slopes associated respectively with said plurality of avoidance trajectories; and
said display presents, on the viewing screen, a plurality of second characteristic signs representing respectively said plurality of second limit slopes, said second characteristic signs being presented horizontally one alongside the other depending on the direction and a value of the corresponding turn so that first and second characteristic signs which are associated with one and the same avoidance trajectory are situated horizontally at the same level.

23. The system as claimed in claim 18, wherein said first limit slope corresponds to a maximum dive slope of the aircraft at which the aircraft descends before applying a full back stick climb with maximum power so as to be able to overfly said terrain.

24. The system as claimed in claim 18, wherein said display comprises a head up viewing device which comprises said viewing screen.

25. The system as claimed in claim 18, wherein it comprises, moreover, a controller that makes it possible to generate and to remove the presentation of the first characteristic sign on said viewing screen.

26. An aircraft, wherein it comprises a system capable of implementing the method specified under claim 1.

27. An aircraft, wherein it comprises a system such as that specified under claim 18.

28. A method of aiding the piloting of an aircraft flying at low altitude, wherein the following operations are carried out in an automatic and repetitive manner:
a) at least one avoidance trajectory is determined, at least over a predetermined distance ahead of the aircraft, said avoidance trajectory corresponding to a low altitude lateral trajectory and exhibiting at least one lateral turn;
b) the profile of the terrain situated under this avoidance trajectory is determined;
c) at least one first limit slope corresponding to a slope that the aircraft must fly so as to be able to overfly said terrain over the whole of said predetermined distance along said avoidance trajectory is determined depending on said profile of the terrain; and
d) a pilot is presented, on a viewing screen, with at least one first characteristic sign which represents said first limit slope and which is associated with a slope scale, with which is also associated a symbol illustrating the ground speed vector of the aircraft, wherein:
said first limit slope corresponds to a minimum slope that the aircraft must fly so as to be able to overfly said terrain over the whole of said predetermined distance along said avoidance trajectory, independently of the performance of said aircraft,
in step c), at least one second limit slope corresponding to a maximum slope at which the aircraft flies is moreover determined depending on predetermined flight conditions and actual performance of said aircraft, and
in step d), at least one second characteristic sign which represents said second limit slope and which is also associated with said slope scale is presented on the viewing screen.

29. A method of aiding the piloting of an aircraft flying at low altitude, wherein the following operations are carried out in an automatic and repetitive manner:
a) at least one avoidance trajectory is determined, at least over a predetermined distance ahead of the aircraft, said avoidance trajectory corresponding to a low altitude lateral trajectory and exhibiting at least one lateral turn;
b) the profile of the terrain situated under this avoidance trajectory is determined;
c) at least one first limit slope corresponding to a slope that the aircraft must fly so as to be able to overfly said terrain over the whole of said predetermined distance along said avoidance trajectory is determined depending on said profile of the terrain; and
d) a pilot is presented, on a viewing screen, with at least one first characteristic sign which represents said first limit slope and which is associated with a slope scale, with which is also associated a symbol illustrating the ground speed vector of the aircraft, wherein:
said first limit slope corresponds to a maximum dive slope of the aircraft, at which the aircraft descends before applying a full back stick climb with maximum power so as to be able to overfly said terrain, and
the first characteristic sign representing said first limit slope is suited to the profile of the terrain.

30. The method as claimed in claim 28, wherein said predetermined flight conditions relate to normal operation of all engines of the aircraft.

31. The method as claimed in claim 28, wherein said predetermined flight conditions relate to an anticipated failure of an engine of the aircraft.

* * * * *